(12) United States Patent
Zeissner et al.

(10) Patent No.: US 8,245,823 B2
(45) Date of Patent: Aug. 21, 2012

(54) VIBRATION DAMPER

(75) Inventors: Bernd Zeissner, Volkach/Gaibach (DE);
Andreas Foerster, Schweinfurt (DE);
Frank Gundermann, Marktsteinach (DE); Steffen Heyn, Niederwerrn (DE);
Anton Krawczyk, Windeck (DE); Uwe Boecker, Lohmar (DE); Thomas Thein, Sennfeld (DE); Wolfgang Breun, Niederwerrn (DE); Herbert Bies, Grafschaft/Vettelhoven (DE); Holger Beyer, Pfarrweisach (DE); Ludwig Gampl, Schwanfeld (DE);
Heinz-Joachim Gilsdorf, Donnersdorf (DE); Klaus Sauer, Roethlein (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 768 days.

(21) Appl. No.: 11/989,723

(22) PCT Filed: Aug. 18, 2006

(86) PCT No.: PCT/EP2006/008157
§ 371 (c)(1),
(2), (4) Date: Jan. 30, 2008

(87) PCT Pub. No.: WO2007/022920
PCT Pub. Date: Mar. 1, 2007

(65) Prior Publication Data
US 2009/0038898 A1    Feb. 12, 2009

(30) Foreign Application Priority Data
Aug. 24, 2005    (DE) .......................... 10 2005 040 283

(51) Int. Cl.
*F16F 9/54* (2006.01)

(52) U.S. Cl. ............................. 188/322.22; 188/322.15
(58) Field of Classification Search .................. 188/283, 188/322.13, 322.15, 322.16, 322.18, 322.22, 188/304
See application file for complete search history.

(56) References Cited

U.S. PATENT DOCUMENTS
4,183,510 A * 1/1980 Kontis ............................ 267/70
(Continued)

FOREIGN PATENT DOCUMENTS
DE    34 45 684    8/1986
(Continued)

OTHER PUBLICATIONS

Search Report dated Nov. 13, 2006 for the underlying International Application No. PCT/EP2006/008157.

*Primary Examiner* — Bradley King
*Assistant Examiner* — Nicholas J Lane
(74) *Attorney, Agent, or Firm* — Cozen 'Connor

(57) ABSTRACT

Disclosed is a vibration damper comprising a cylinder in which a piston rod is guided in an axially movable manner. A first piston is mounted stationarily on the piston rod while a second piston that is equipped with at least one valve disk biased by a spring assembly is mounted on the piston rod so as to be axially movable counter to a force of at least one support spring. The spring assembly is provided with at least one spring plate on which the spring assembly rests. The second piston is retained by a fixing sleeve which supports the at least one spring plate. The structural unit encompassing the fixing sleeve and the at least one spring plate is fitted with an axially effective separating joint for a locking connection inside the structural unit. The entire structural unit can be axially displaced towards the at least one support spring.

5 Claims, 4 Drawing Sheets

U.S. PATENT DOCUMENTS

| | | | | |
|---|---|---|---|---|
| 4,307,873 | A | * | 12/1981 | Molders ................ 267/64.15 |
| 4,396,098 | A | * | 8/1983 | Petrak ........................ 188/280 |
| 4,877,115 | A | * | 10/1989 | Bauer et al. ............. 188/282.1 |
| 4,898,493 | A | | 2/1990 | Blankenburg ............... 403/326 |
| 5,219,414 | A | * | 6/1993 | Yamaoka ................... 188/284 |
| 5,560,456 | A | * | 10/1996 | Koch et al. ................ 188/300 |
| 5,911,290 | A | * | 6/1999 | Steed ...................... 188/282.4 |
| 6,116,807 | A | * | 9/2000 | Dzurko et al. ............. 403/165 |
| 6,179,100 | B1 | * | 1/2001 | Mintgen et al. .......... 188/282.1 |
| 6,651,787 | B2 | | 11/2003 | Grundei |
| 7,549,519 | B2 | * | 6/2009 | Atwater et al. ............. 188/381 |
| 2002/0027051 | A1 | * | 3/2002 | Grundei .................. 188/322.15 |
| 2002/0179388 | A1 | * | 12/2002 | Moradmand et al. .... 188/322.13 |
| 2003/0051957 | A1 | | 3/2003 | Lemieux |
| 2004/0245058 | A1 | * | 12/2004 | Diederich et al. ....... 188/322.15 |

FOREIGN PATENT DOCUMENTS

| | | |
|---|---|---|
| DE | 39 26 704 | 9/1990 |
| DE | 10 2004 015448 | 8/2005 |
| JP | 10 339345 | 12/1998 |

\* cited by examiner

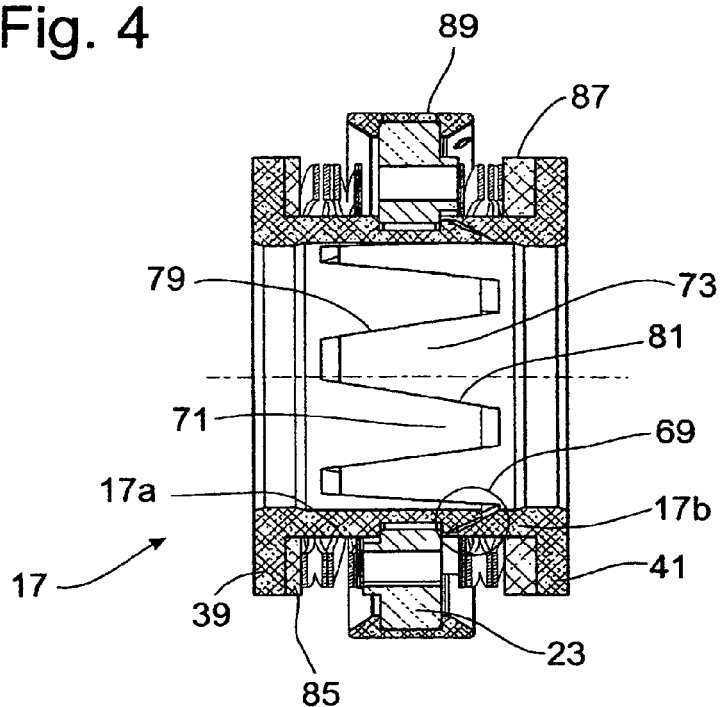
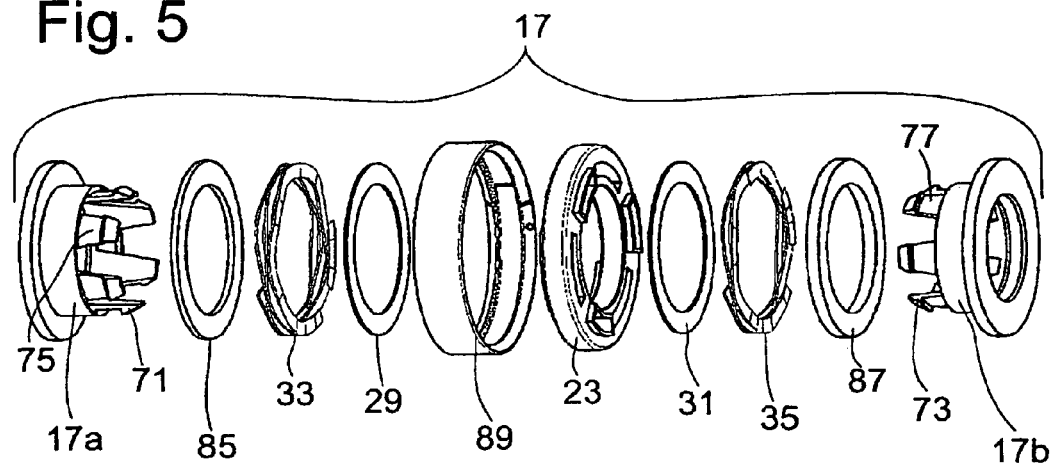

VIBRATION DAMPER

CROSS-REFERENCE TO RELATED APPLICATIONS

This is a U.S. national stage of International Application No. PCT/EP2006/008157, filed on 18 Aug. 2006. Priority is claimed on German Application No. 10 2005 040 283.6, filed on 24 Aug. 2005.

BACKGROUND OF THE INVENTION

1. Field of the Invention
The invention pertains to a vibration damper.
2. Description of the Related Art U.S. Pat. No. 6,651,787 discloses a vibration damper which fulfills the function of filtering out high-frequency, low-amplitude excitations and thus offers a comfort advantage over conventional vibration dampers. A first piston is fastened permanently to the piston rod. The second piston slides on the piston rod and is supported by two springs. One of these support springs rests against the first piston, whereas the second support spring rests against a spring plate, which is held in turn by a lock washer. The support springs pretension the valve disks against the second piston and also oppose the axial movement of the second piston. This design requires a complicated assembly procedure and also means that the pretension of the valve disks depends on the axial force which supports the second piston.

A vibration damper with a cylinder in which a piston rod is guided with freedom of axial movement is known from JP 10-339,345 A. A first piston is fastened permanently to the first piston rod, and a second piston is mounted with a certain freedom of movement in the axial direction. The second piston has elastic valve disks and can shift axially against the elastic force of springs. The cylinder has a working space on the piston rod side of the first piston, another working space on the side of the first piston opposite the piston rod, and a working space between the two pistons. Valve-equipped through-openings control the connection between the working spaces. This design also fails to provide a structural unit which can be preassembled for the second piston with its springs.

SUMMARY OF THE INVENTION

The task of the present invention is to improve the vibration damper of the general type in question in such a way that the second piston can be easily assembled and also so that the pretension of the valve disks is independent of the axial forces of the support springs.

According to the invention, the task is accomplished in that the second piston is held in place by a retaining sleeve, which carries the minimum of one spring plate, where the structural unit consisting of the retaining sleeve and the minimum of one spring plate has an axially effective joint for a latching connection within the structural unit, where the entire structural unit can be shifted axially as a whole against the minimum of one support spring.

The great advantage is that, through the use of a retaining sleeve, a structural unit is provided which can be produced independently of the vibration damper and then sent to the assembly process. The structural unit can be checked over before it is installed in the vibration damper and very easily disassembled again if any defects are found. A strict functional separation, furthermore, is present between the forces of the support springs for the structural unit and the spring arrangement for the valve disks.

In a first variant, the latching connection is provided between the minimum of one spring plate and the retaining sleeve.

The second piston is carried externally by the retaining sleeve, so that the second piston can slide directly on the piston rod.

To facilitate assembly, the retaining sleeve is provided with radial elasticity. The use of plastic for the retaining sleeve increases this elasticity.

The retaining sleeve can also have longitudinal slots to increase the radial elasticity.

According to an advantageous embodiment, the retaining sleeve is equipped with at least one sealing ring against the cylinder to prevent any undefined leakage between the working spaces of the vibration damper.

The retaining sleeve has a retaining groove for the second piston. This prevents any unwanted axial displacement of the piston from changing the force with which the spring arrangement is pretensioned onto the piston.

The area adjacent to the retaining groove is designed as a feed bevel, which helps the retaining sleeve to expand radially during the assembly procedure.

To obtain an axially compact arrangement of the structural unit including the minimum of one support spring, the minimum of one spring plate is designed in the form of a cup with an angled rim, where the rim and the bottom part of the spring plate serve as support surfaces for the spring arrangement and a support spring.

To prevent leakage at the piston, the second piston has at least one sealing ring on its inside diameter.

In an alternative embodiment, the retaining sleeve is designed as a two-piece unit and is held axially together by a latching type of connection.

A retaining sleeve can be designed as an integral part of a spring plate.

The retaining sleeve carries the second piston by the piston's inside diameter.

In another advantageous embodiment, the retaining sleeve has finger-like snap hooks, which engage the second piston. The retaining sleeves can be designed as identical components, which act as mirror images of each other on the piston.

BRIEF DESCRIPTION OF THE DRAWINGS

FIG. 4 shows a structural unit with a retaining sleeve split into two axial parts; and FIG. 5 shows an exploded drawing of the unit according to FIG. 4.

DETAILED DESCRIPTION OF THE PREFERRED EMBODIMENTS

Figure 1:
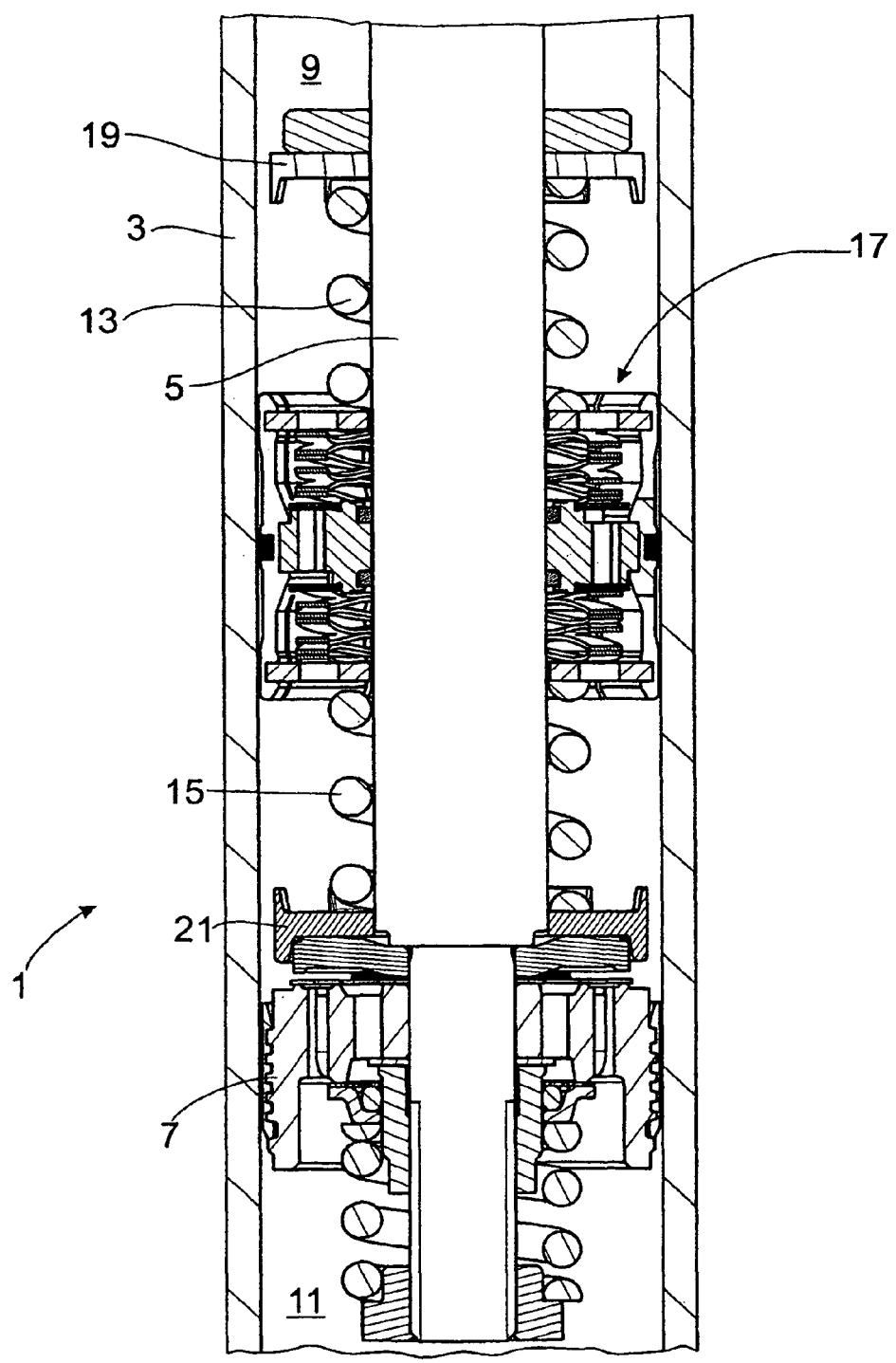
FIG. 1 shows a piston rod with the first piston and the inventive structural unit with the second, axially movable piston.

FIG. 1 shows part of a vibration damper 1 with a damping medium-filled cylinder 3, in which a piston rod 5 is guided with freedom of axial movement. A first piston 7 is fastened axially to the piston rod 5. This piston 7 divides the cylinder into a working space 9 on the piston rod side and a working space 11 on the side of the piston opposite the piston rod. The design and function of the piston 7 are generally known. For additional information, see DE 34 45 684 A1, FIG. 2, the disclosure of which is intended to be part of this description of the figures.

In the piston-rod side working space 9, two support springs 13, 15 are mounted on the piston rod 5. The support forces of these springs act in opposite directions on a structural unit 17, which is shown in isolation in FIG. 2. An end surface of each support spring 13, 15 rests against a support disk 19, 21, which is stationary with respect to the piston rod 5. When the piston rod moves, the structural unit 17 can shift axially with respect to the first piston 7 against the forces of the support springs 13, 15.

Figure 2:
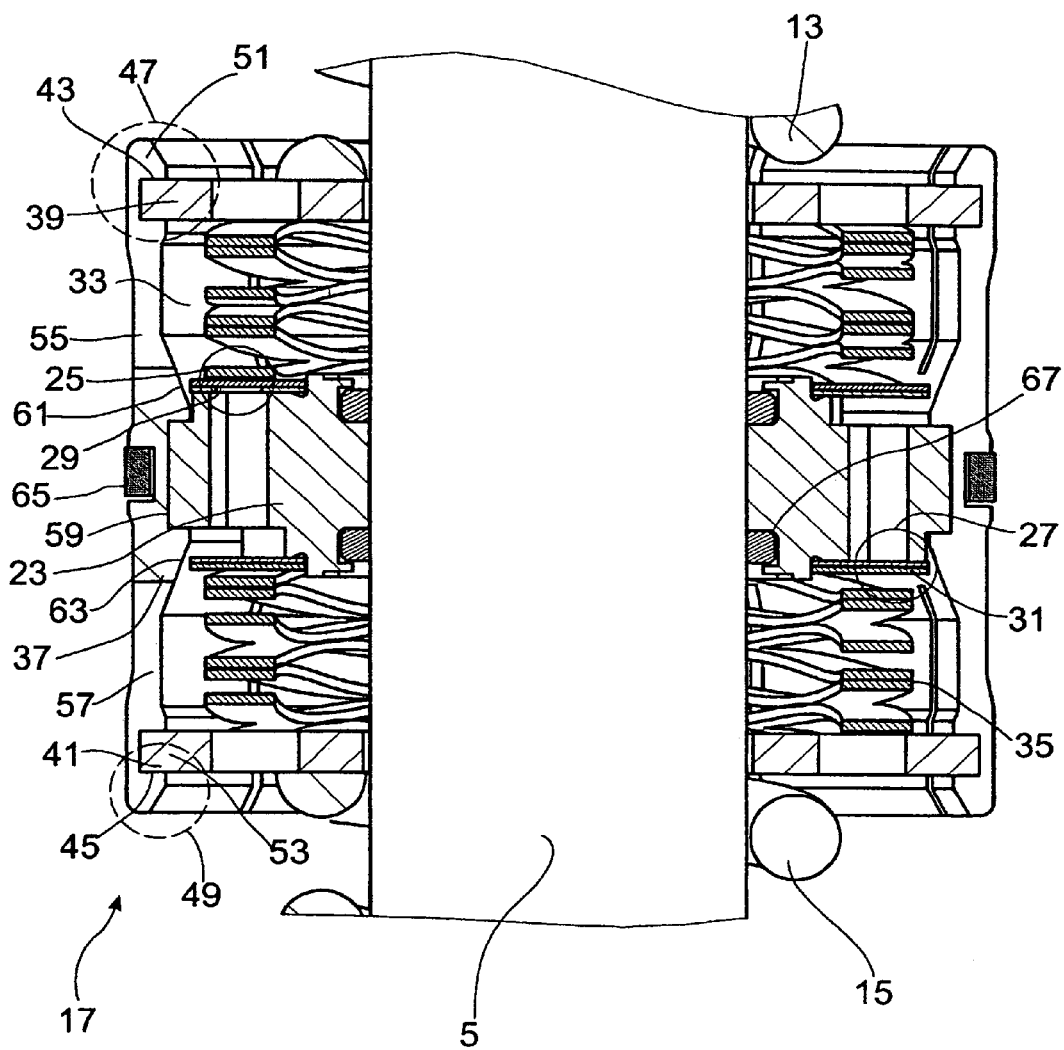
FIG. 2 shows the structural unit according to FIG. 1 in isolation.

FIG. 2 shows the structural unit 17, which has a second piston 23. The second piston 23 has damping valves 25, 27 with valve disks 29, 31, each of which is pretensioned by a spring arrangement 33, 35 in the form of wave washers. The number and form of the springs of the spring arrangements 33, 35 can be different from that shown in FIG. 2 if desired.

The second piston is held by a retaining sleeve 37, each end of which carries a spring plate 39, 41 for the spring arrangements 33, 35. The spring plates 39, 41 are components which are separate from the retaining sleeve 37, so that two axially effective joints 43, 45 are present, which are held together by a latching type of connection 47, 49, so that the entire structural unit 17 is able to shift axially as a whole against the force of the support springs 13, 15. The retaining sleeve has rim segments 51, 53, which rest against the external cover surfaces of the spring plates 39, 41.

The retaining sleeve 37 is provided with radial elasticity, promoted by the use of a plastic material and also by the presence of longitudinal slots 55, 57. The second piston 23 is carried externally by the retaining sleeve 39, for which purpose the retaining sleeve has a retaining groove 59 on the inside. To facilitate assembly, the area adjacent area to the retaining groove is designed with feed bevels 61, 63, so that the piston can be pushed in from either side into the retaining groove.

To prevent leakage around the cylinder, a sealing ring 65 is fitted into the retaining sleeve 37, and at least one sealing ring 67 is provided on the inside diameter of the second piston.

During the assembly procedure, the second piston 23, equipped with its sealing rings 67, is pushed into the open end of the retaining sleeve 37 up as far as the retaining groove 59. During this step, the feed bevel 61 or 63 causes the retaining sleeve to expand radially. Then the valve disks 29, 31 and the spring arrangements 33, 35 are inserted into the ends of the retaining sleeve. Finally, the spring plates 39, 41 are added to close off the structural unit 17.

The principle by which the vibration damper operates is essentially the same as that according to U.S. Pat. No. 6,651,787, which means that there is no need to repeat the description here. There is a difference, however, in that the separation between the support springs 13, 15 and the spring arrangements 33, 35 offers a damping force characteristic which is better able to meet the relevant requirements.

Figure 3:
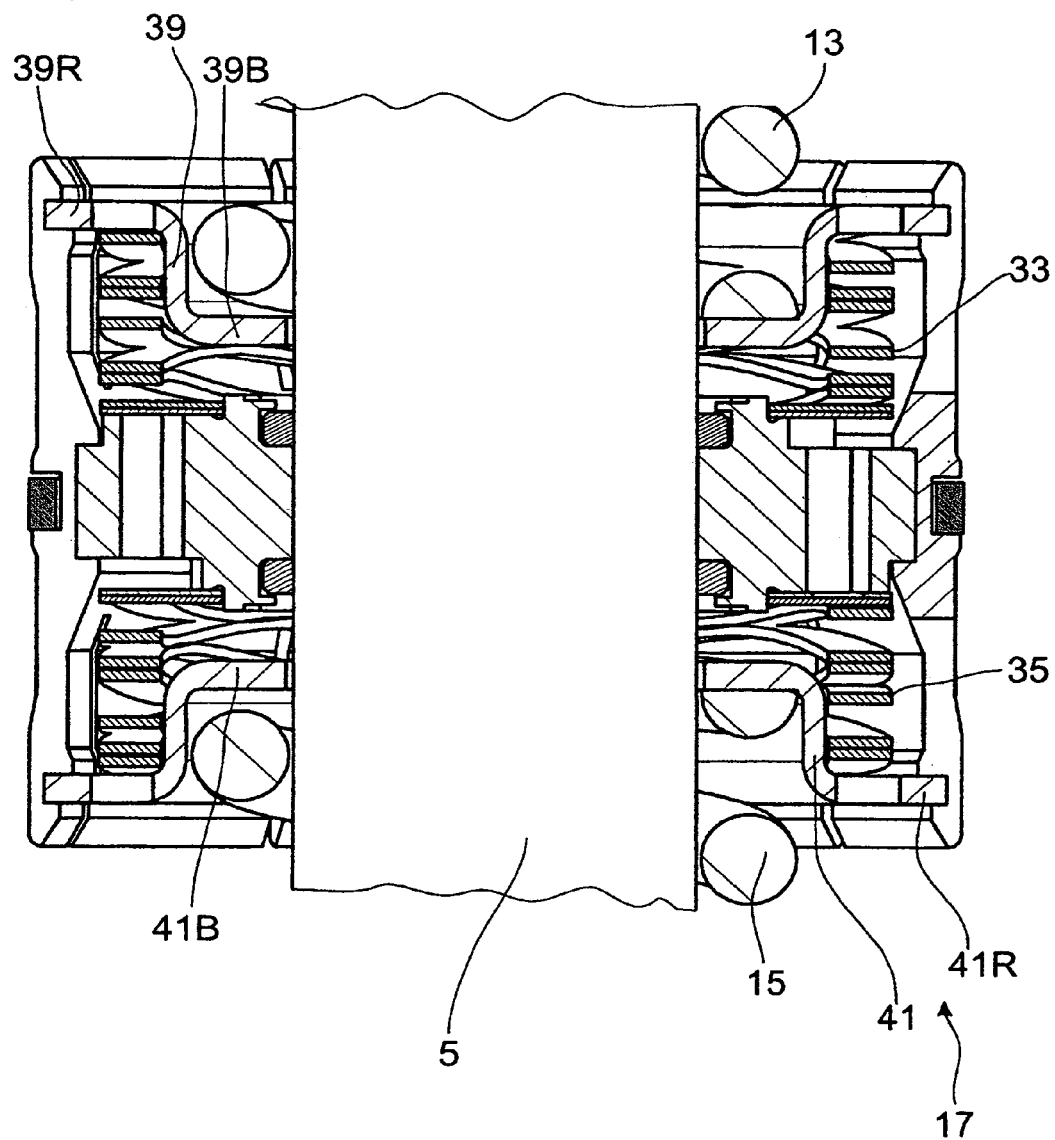
FIG. 3 shows a structural unit representing an alternative to that of FIG. 2.

The design of the structural unit 17 according to FIG. 3 is the same in principle as that of the unit in FIG. 2. The difference is that spring plates 39, 41 are used which are designed in the form of cups with angled rims 39R, 41R and bottom parts 39B, 41B. These rims and bottom parts serve as support surfaces for the spring arrangements 33, 35 and for the support springs 13, 15. It is therefore possible, within certain limits, for the spring arrangements 39, 41 to overlap the support springs 13, 15 axially, which means that a larger amount of space can be made available overall for the support springs 13, 15 in the axial direction.

FIG. 4 and the associated exploded drawing according to FIG. 5 show a structural unit 17, the retaining sleeve of which is split into two axial parts and thus comprises two sleeve parts 17a, 17b, which are fastened by a latching connection 69 to the second piston 23. Each of the retaining sleeve parts 17a, 17b is designed as an integral part of one of the spring plates 39, 41. An essential differences versus the variants according to FIGS. 2 and 3 is that the retaining sleeve carries the second piston 23 by the piston's inside diameter. The retaining sleeve parts 17a, 17b have finger-like snap hooks 71, 73, which are spaced around the circle in the same way, so that the snap hooks 71 on one side can engage in the gaps between the snap hooks 73 on the other side. Retaining groove segments 75, 77 are provided on the outside surface of the snap hooks, so that the retaining sleeve parts 17a, 17b can be attached independently of each other to the second piston 23. As can be seen in FIG. 4, the lateral surfaces 79, 81 of the finger-like snap hooks 71, 73 are, so that, through the choice of an appropriate angle to the longitudinal axis, a self-locking effect can be obtained. This self-locking effect is secured by the permanent pretension of the support springs 13, 15. The joint between the two retaining sleeves 17a, 17b extends along the lateral surfaces 79, 81 of the snap hooks.

In regard to FIGS. 2 and 3, it should also be made clear that the spring arrangements 33, 35 can also have elastomeric springs 85, 87, which provide a progressive spring force characteristic. A conventional piston ring 89 is used to seal off the structural unit 17 against the cylinder.

What is claimed is:

1. A vibration damper comprising:
   a cylinder;
   a piston rod guided with freedom of axial movement in the cylinder;
   a first piston fixed to the piston rod; and
   a structural unit mounted on the piston rod with freedom of axial movement relative to the first piston against the force of at least one support spring, the structural unit comprising
   a second piston equipped with at least one valve disk loaded against the second piston by a spring arrangement;
   a retaining sleeve having a first longitudinal end and a second longitudinal end opposite the first longitudinal end, which carries the second piston between the first and second longitudinal ends and prevents axial movement of the second piston relative to the retaining sleeve, the retaining sleeve comprising two axial retaining sleeve parts, each axial part having a plurality of finger snap hooks spaced around a circumference of the respective retaining sleeves and retaining groove segments arranged on an outside surface of the respective plural snap hooks, the second piston retained on the two axial retaining sleeve parts by arrangement of the second piston in the retaining groove segments of the plural finger snap hooks the retaining sleeve comprises the two axial sections which are held together by latching to the second piston,
   wherein the finger snap hooks on a first one of the two axial retaining sleeve parts interdigitate with the finger snap hooks on a second one of the two axial retaining sleeve parts;
   at least one spring plate connected to the retaining sleeve at a joint which prevents movement of the spring plate relative to the retaining sleeve, the spring arrangement being located between the at least one spring plate and a respective at least one valve disk.

2. The vibration damper of claim 1 wherein the at least one spring plate is integrally formed with the retaining sleeve at said joint.

3. The vibration damper of claim 1 wherein the retaining sleeve carries the second piston radially outside the retaining sleeve.

4. The vibration damper of claim 3 wherein the retaining sleeve is radially resilient.

5. The vibration damper of claim 1 wherein each said axial section is formed as one piece with a respective said spring plate.

* * * * *